United States Patent [19]

Newkirk

[11] Patent Number: 4,861,193

[45] Date of Patent: Aug. 29, 1989

[54] SOFT SEAWALL

[76] Inventor: Haywood H. Newkirk, P.O. Box 7036, Wilmington, N.C. 28406

[21] Appl. No.: 148,614

[22] Filed: Jan. 26, 1988

[51] Int. Cl.$^4$ ............................................... E02B 3/06
[52] U.S. Cl. ...................................... 405/28; 405/21; 405/66
[58] Field of Search ..................... 405/15, 21, 22, 23, 405/25, 26, 27, 28, 211, 64, 67

[56] References Cited

U.S. PATENT DOCUMENTS

| 436,644 | 9/1890 | White | 405/27 |
|---|---|---|---|
| 449,185 | 3/1891 | Solomon | 405/32 |
| 2,129,560 | 9/1938 | Blyly | 405/15 |
| 2,135,337 | 11/1938 | Herbest, Jr. | 405/32 |
| 3,182,459 | 5/1965 | Grether et al. | 405/36 X |
| 4,023,370 | 5/1977 | Watson | 405/26 |
| 4,123,185 | 10/1978 | Hagen et al. | 405/26 X |
| 4,484,836 | 11/1984 | Bailard | 405/64 X |
| 4,710,056 | 12/1987 | Parker | 405/15 |
| 4,710,057 | 12/1987 | Laier | 405/30 |
| 4,738,563 | 4/1988 | Clark | 405/21 |

FOREIGN PATENT DOCUMENTS

| 7710671 | 4/1979 | Netherlands | 405/25 |
|---|---|---|---|
| 0000084 | 2/1979 | PCT Int'l Appl. | 405/30 |
| 1018 | 4/1866 | United Kingdom | 405/15 |

OTHER PUBLICATIONS

"T-Shaped Wall Traps Sand to Build Beaches", Popular Mechanics, p. 62, Jun. 1960.

Primary Examiner—Dennis L. Taylor
Assistant Examiner—Arlen L. Olsen
Attorney, Agent, or Firm—Berman, Aisenberg & Platt

[57] ABSTRACT

A "soft" seawall for a beach comprises a barrier made of a flexible membrane which can be deployed at the onset of a storm and taken down after the storm has passed. This allows the beach to rebuild naturally during calm periods and prevents erosion during storms. The barrier is held in the deployed position by bollards located on the shore and dolphins located in the water. The dolphins in the water are pivotally mounted so they lie on the floor when the barrier is not deployed. Ballards on the shore contain spindles for winding the flexible membranes up to retract them. Cables are attached to ends of the membranes, and these cables are reeled in to pull the membranes into the ocean during deployment. Preferably, the membranes are arranged to form pools for dissipating the force of the waves.

16 Claims, 3 Drawing Sheets

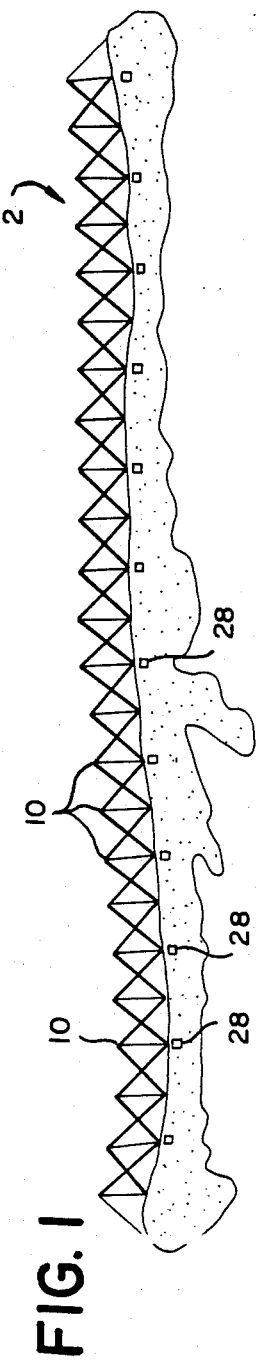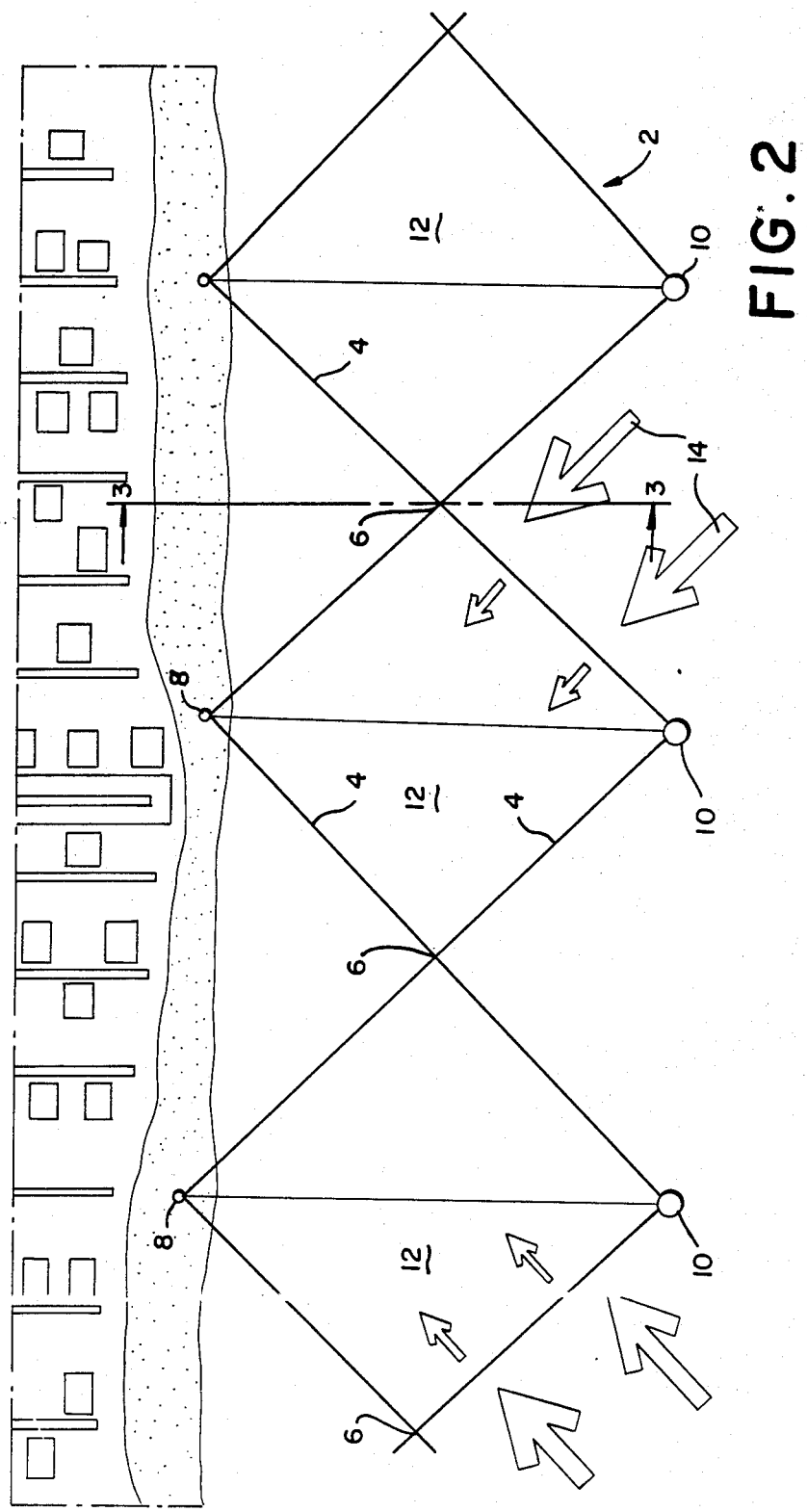
FIG. 1
FIG. 2

SOFT SEAWALL

TECHNICAL FIELD

This invention relates to the art of seawalls. In particular, the invention relates to a removable seawall which can be erected at the onset of a storm and then disassembled.

BACKGROUND

Beach erosion is a very serious problem. Every year miles of valuable beach property are washed away, and millions of dollars are spent rebuilding beaches. In addition to simply rebuilding the beaches, millions of dollars have been spent to construct seawalls, or the like, in an attempt to prevent erosion. Most seawalls, however, are "hard" structures in that they are permanent and cannot be taken down during calm periods. These hard structures are not desirable and in some locations are not permitted.

U.S. Pat. Nos. 3,182,459 and 3,218,810 (Grether et al.) show a synthetic levee that may be erected to provide, for example, a rice paddy. The levee is formed by a wall of flexible material having one end buried in the earth and a top edge supported by a wire strung between fixed posts. U.S. Pat. No. 3,564,853 (Csiszar) teaches a method for controlling erosion by securing flexible screens to the bottom of the ocean. The screens are placed at a substantial distance from the shore and trap sand to create sand bars to dissipate the force of the waves. U.S. Pat. No. 4,490,071 (Morrisroe) teaches a plurality of flexible "fingers" on the bottom of the shoreline to simulate seaweed. The fingers accrete sand to prevent erosion. U.S. Pat. No. 4,647,250 (Howard) teaches a flexible dam which is secured to the floor of a river at one end and to a ship at an opposite end.

SUMMARY OF THE INVENTION

Prior art, such as shown in the Csiszar and Morrisroe patents, have not been successful. One reason these attempts have not worked may be that accumulation of sand as a means of preventing erosion does not affect the wave action. Thus, the shore is still washed away in a storm of any appreciable size.

Seawalls like those shown in the Grether patents are permanently secured to the floor of the body of water and cannot be easily taken down after a storm has passed. Moreover, these walls are secured at their tops and bottoms and do not have the flexibility required to absorb the energy of a wave.

The flexible dams shown by the Howard patent require the use of a ship and would be impractical for prevention of erosion along a beach.

In accordance with the invention, a "soft" seawall is provided which may be assembled (deployed) when a storm is threatened and disassembled when the storm has passed. The seawall comprises a plurality of barriers made of flexible membranes which may be arranged in a variety of configurations. The flexible membranes are extended outwardly from the shore when deployed. In one embodiment, the barriers are arranged as a plurality of rectangles to form a plurality of compartmentalized areas to trap the water currents. In addition, a sawtooth front barrier is presented to the incoming waves to assist in breaking up the wave and substantially reducing the power of the wave. By using flexible membranes reinforced with tensile members, the power of a wave may be absorbed very efficiently.

The rectangles are spaced along the shore for any desired distance and are, in one embodiment, connected to each other at contiguous corners. The barriers extend into the water by distances which will depend upon the circumstances. For example, the barriers may extend into the water by distances up to several hundred feet. The reinforced membranes themselves are preferably made of a flexible material such as a spun bonded sheet of dense polyethylene sold under the trademark "Tyvec." The thickness of the membrane may be about 0.025 in. and the height may be about 25 feet. Other materials and dimensions will be apparent to those of skill in the art. The membranes could be of woven Dacron, Nylon, or polyester In other embodiments, the membranes form rectangles which are spaced along the shoreline by single courses of the membrane or the membranes form a sawtooth barrier without the rectangles.

The parts of the barrier remote from the shore are held by dolphins which are secured to the ocean floor in such a manner that they can be easily erected when needed and replaced on the floor when not needed. In one embodiment, the dolphin is pivotally mounted to a concrete pillar whereby it may be pivoted into an upright position for use or pivoted to lie on the floor when not in use.

The barriers are wound around a spindle located on the shore when in the stored position, the spindle being driven by any of several known drive systems. Cables, such as small diameter steel cables, extend from ends of the membranes, around pulleys on the bollards, and back to the spindle. When it is desired to deploy the barriers, the cables are reeled in to pull the membranes into the water to erect the barriers. The barriers are disassembled by reeling in the membranes and reeling out the cables. The cables may be allowed to lie in the sand or they may lie in small trenches or tubes to prevent interference with users of the beach.

In the embodiments where the membranes form rectangles or other geometric shapes, the tensions on the cables are adjusted to cause the winding or unwinding to occur in a manner which will maintain the membranes in predetermined positions.

It is an object of this invention to provide a barrier which prevents beach erosion.

Another object of this invention is to provide a barrier which prevents beach erosion and which may be erected when a storm is threatened and taken down when the storm has passed.

Yet another object of this invention is to provide a system for erecting a soft seawall.

Still another object of this invention is to provide a soft seawall wherein a plurality of flexible membranes form compartmentalized areas for trapping ocean currents near the shore.

BRIEF DESCRIPTION OF THE DRAWINGS

FIG. 1 is a top view of an apparatus for preventing beach erosion in accordance with the invention.

FIG. 2 is an enlarged top view of the apparatus shown in FIG. 1.

DETAILED DESCRIPTION OF THE PREFERRED EMBODIMENTS

Figure 3:
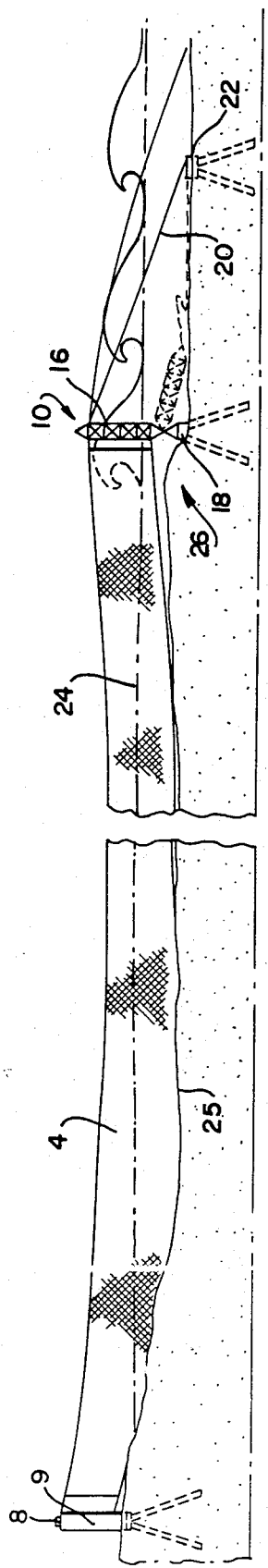
FIG. 3 is a cross section of the apparatus shown in FIG. 2 taken along line 3—3.

FIG. 1 is an aerial view of a shore having an erosion prevention seawall arrangement 2 in accordance with the invention erected therealong. The seawall comprises a barrier made of a flexible membrane arranged, in the embodiment of FIG. 1, as a series of rectangles secured at contiguous corners to each other and at opposite corners to bollards on the shore and dolphins spaced from shore. The seawall forms a series of compartmentalized pools and presents a jagged edge to the incoming waves for absorbing the forces of the waves, as will be explained further below.

FIG. 2 is an enlarged view of the seawall shown in FIG. 1. Flexible membranes 4 extend outwardly from the shore and form rectangles connected at corners 6. The membranes are connected at corners 6 by any of a variety of techniques, such as by sewing them together. It will be appreciated that the rectangles may be made of a plurality of membranes each having the length of one side of a rectangle and sewn or fused to the other sheets, or some membrane sheets may have a length of twice the dimension of the rectangles with shorter sheets sewn thereto.

The membranes are attached to the shore at bollards 8 on the shore and are held extended into the ocean by dolphins 10 in the ocean. The construction of these bollards and dolphins will be clear from the description below.

The arrangement shown in FIG. 2 forms compartmentalized pools 12 for dissipating the force of the waves and confining the currents to the pools 12, thus protecting the shore. In addition, because the membranes 4 are flexible and are secured to the earth only at opposed ends, the forces of waves incident on the outer walls, as indicated by arrows 14, causes them to bow inwardly and upwardly thus dissipating some of the forces of the waves. A similar action takes place for waves incident at an angle to the front walls, the walls acting to break up these waves as the wave moves along the wall.

FIG. 3 is a cross section along 3—3 of FIG. 2 and shows the construction in more detail. Membrane 4 is secured to bollard 8 which is in turn secured to the shore. Bollard 8 preferably comprises a spindle as illustrated at 9 around which the membrane 4 may be wound. The spindle may be driven, for example, by a motor and transmission (not shown) known in the art. The membrane preferably has strengthening material at its upper and lower edges to increase the tensile strength of the membrane. Dolphin 10 comprises a rigid structure 16 pivotally mounted to a base 18 on the ocean floor. Rigid structure 16 is preferably a beam made of a plurality of trusses whereby it is strong and yet easily transported and installed. Base 18 may be made of concrete or other known structure for attachment of the rigid structure 16 to the ocean floor. The rigid structure 16 is shown in a lowered position in phantom lines. The structure 16 is placed in the lowered position during those periods when the seawall of the invention is not deployed, e.g. periods of calm weather.

Rigid structure 16 is maintained in an upright position by the tension on the membrane 4 and inflated air tanks (not shown), and the membrane tension is resisted by cables which are attached to anchors 22 which are secured to the ocean floor in a known manner. Cables 20 are of lengths which provide the necessary tension when the rigid structure is upright and which lie loosely on the floor when the rigid structure is in the position shown in phantom lines. In the preferred embodiment, there are a plurality of cables 20 to supply tension to support structure 16 in a plurality of directions.

The average level of the water is depicted in FIG. 3 by the dash-dot line 24, and it will be appreciated that the top of membrane 4 is above this level even though the waves will be high enough to flow over the top of the membrane.

The ocean floor generally slopes away from the shore to a low point, or slough, 25 and then slopes upwardly to form a berm 26. The slough and berm are caused by the natural action of the waves during periods of calm. Membrane 4 is designed to conform to the contour of the ocean floor as closely as possible between the shore and berm 26.

Preferably, the corners 6 are located above the centerline of slough 25, and the dolphins 10 are located at the berm 26. By this design, the front face of the membranes is located on berm 26 to interact with the normal action of the waves to effectively dissipate the force of the waves. The pools 12 are centered over the slough 25 to effectively trap the water currents.

Figure 4:
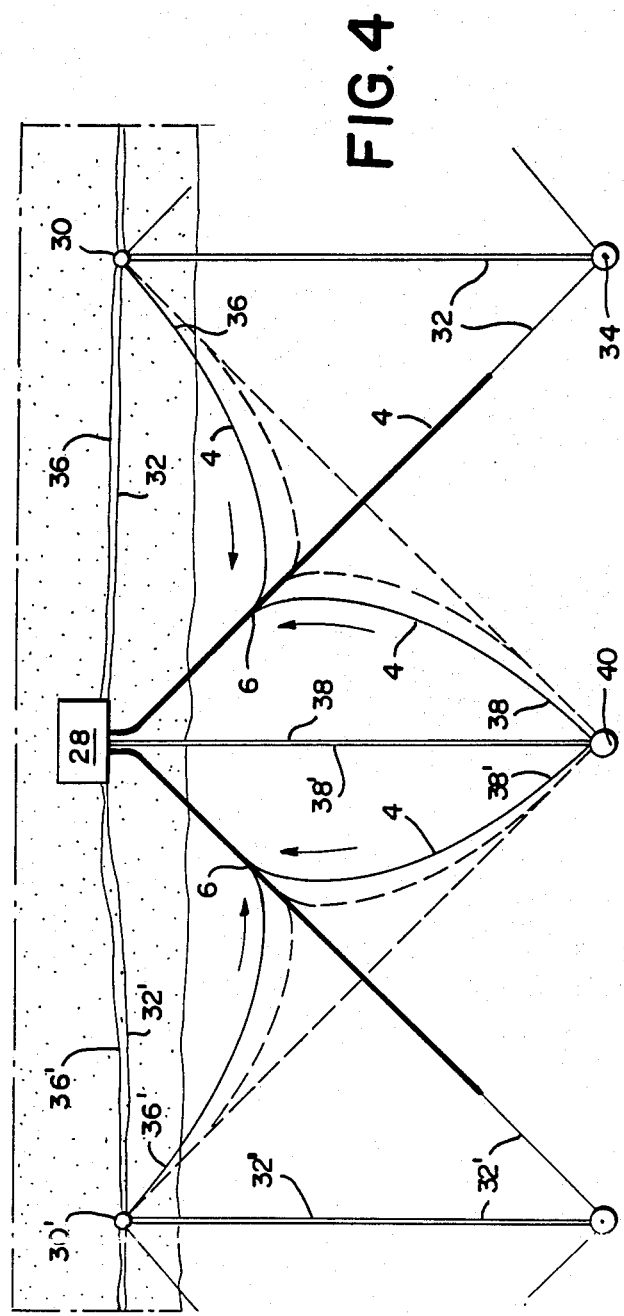
FIG. 4 is a top view of the apparatus shown in FIG. 2 illustrating retraction and deployment.

FIG. 4 is a diagram for illustrating how the seawall of the invention is deployed and retracted. The rectangles of FIG. 2 are comprised of a plurality of X-shaped pieces, two adjacent ones of which are shown in FIG. 4. A mechanical building 28 contains a bollard having a spindle around which are wound the membranes which make up the two X-shapes pieces. Bollards 30, on opposite sides of mechanical building 28, are not driven but provide pulleys for allowing the passage of cables attached to the ends of the membranes. A cable 32 extends from the mechanical building 28, around bollard 30, and around pulley 34 mounted to the top of a dolphin 10. The end of the cable is attached to a remote end of a membrane 4 having a length such that it extends from the mechanical building to the dolphin 10 and pulley 34 when deployed. A second cable 36 extends from the mechanical building 28 around bollard 30 and is attached to one of the shorter pieces of membrane. A third cable 38 extends from the mechanical building 28 around a pulley 40 mounted to a dolphin 10 remote from the shore and is attached to the end of another of the shorter pieces of membrane 4. The identical structure is used for the other X-shaped element shown in FIG. 4, and like parts have been identified with the same reference numerals, but primed.

The retracting operation of the structure in FIG. 4 is as follows. If the membranes are deployed, as shown in FIG. 2, a spindle in the mechanical building is activated to begin reeling in the membrane 4, and at the same time pulleys controlling cables 32, 36, and 38 are reeled out. The tensions on the membranes and the cables are maintained such that the proper winding characteristics are provided. It will be appreciated that tension measuring instruments may be used to control the speed by which the cables are allowed to reel out and to control the reeling in of the membrane.

FIG. 4 illustrates how the shorter membranes will be pulled by their connection 6 with the longer membrane to lie along the longer membrane as cables 32, 36, and 38 are reeled out and the membrane is reeled in.

Cables 32 and 36 will extend from the mechanical building around the pulleys and back to the mechanical building when the membranes have been reeled in. The cables may simply lie in the sand, for example, if the beach is not used. If the beach is used, the cables may lie in a small channel or tube which would be inexpensively constructed much like a known drainage trench.

Deployment is the reverse of the above procedure. Pulleys controlling cables 32, 36, and 38 are reeled in while the membranes are reeled out. This action pulls the membranes into the positions shown in FIG. 2. Rigid structures 16 are floated, by inflating bladder air tanks, into their upright positions as tension is applied through the cables and the pulleys 34 and 40, and cables 20 retain the structures 16 in position to resist the tension of the membranes.

Figure 5:
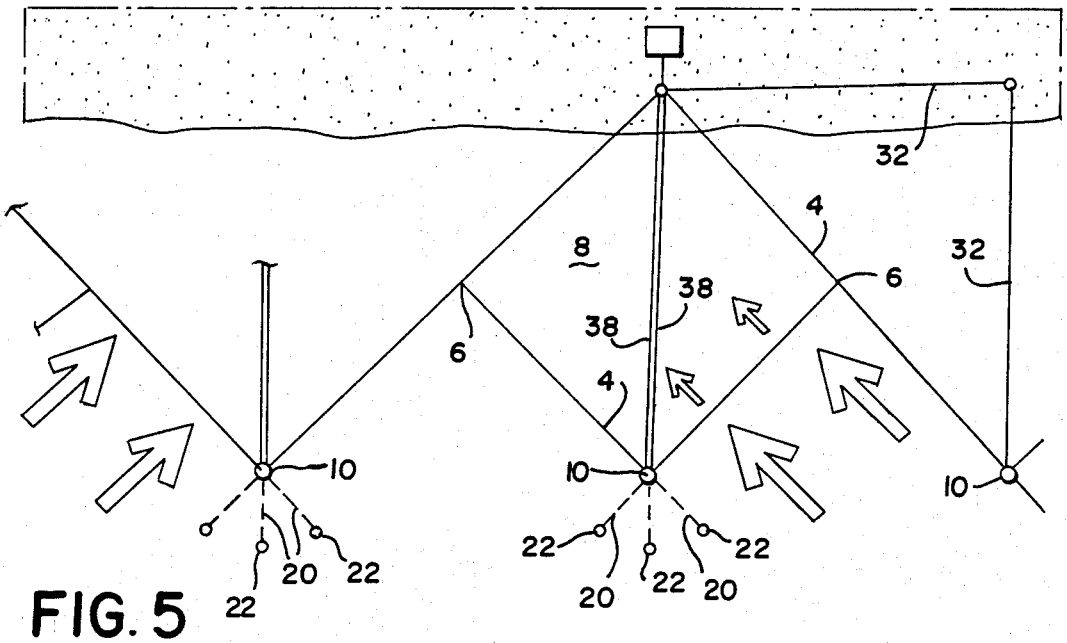
FIG. 5 is a top view of a second embodiment of the invention.

FIG. 5 shows a second embodiment wherein the membranes are T-shaped and are arranged to form more widely spaced rectangular pools 8. It will be appreciated that deployment is accomplished in the same manner as described above with respect to FIG. 4, the difference being that cable 36 is not needed because a short membrane piece has been eliminated. This arrangement has the same characteristics as those set forth with respect to the arrangement shown in FIG. 2. Because there are fewer pools 8, however, the ability to dissipate waves may be somewhat less.

Figure 6:
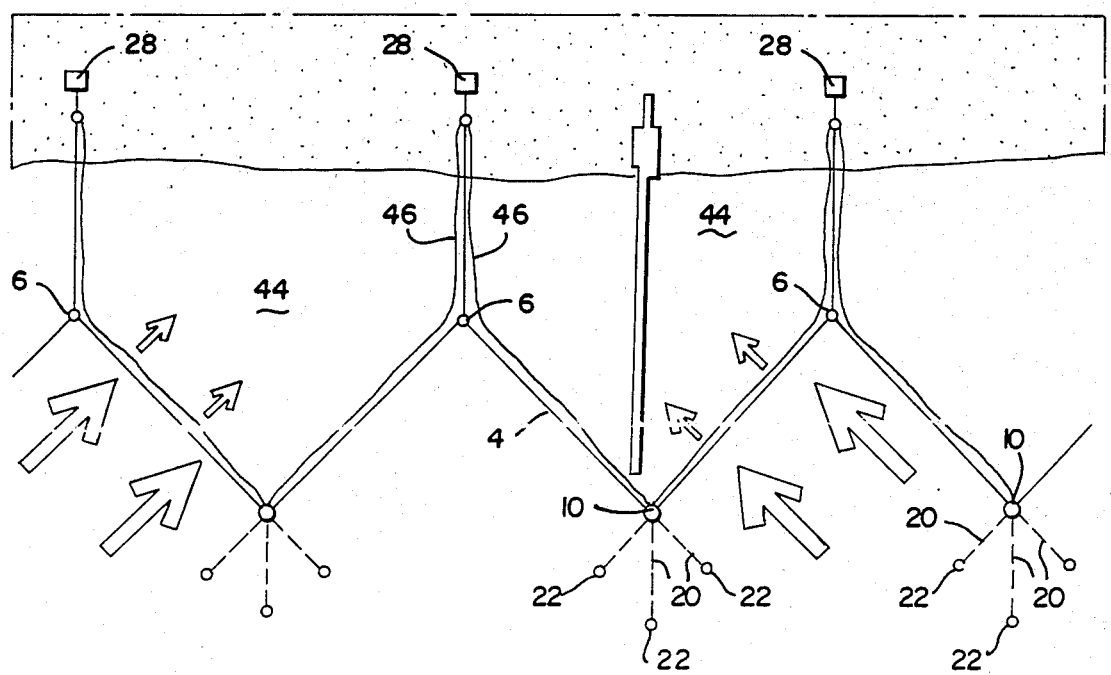
FIG. 6 is a top view of a third embodiment of the invention.

FIG. 6 shows an arrangement wherein a sawtooth-like seawall is spaced from the shore and to provide pools 44 formed between the membranes and the shore. Removal of the seawall in the arrangement shown in FIG. 6 may be accomplished in a manner similar to that described above. That is, mechanical buildings 28 would reel in a Y-shaped membrane extending from the mechanical building to spaced dolphins 10 while reeling out cables 46 which are connected to ends of adjacent Y-shaped membranes. Deployment would be the reverse of this operation.

It will be appreciated that a unique structure has been described which will greatly reduce, if not eliminate, beach erosion. Prevention of the washing away of the beach during storms in essence rebuilds the beach because it allows the natural accumulation of sand which occurs during calm periods to remain. It has been estimated that most beaches grow naturally each year, but that growth is reversed during storms. The "soft" seawall of the invention is deployed only during storms and prevents damage while permitting natural rebuilding.

Modifications within the scope of the claims will be apparent to those of skill in the art.

I claim:

1. A removable seawall comprising barrier means for extending into a body of water and engaging waves in said body of water, means for deploying said barrier to an operative position and for retracting said barrier to an inoperative position, and dolphin means for attachment to a floor in said body of water, said barrier means comprising a flexible membrane having at least two walls which intersect at a non-zero angle for forming an area for confining said water, said means for deploying and retracting said barrier means comprising cable means attached to each of said two walls for extending from a first location near the edge of said body of water to said dolphin means and to said first location, means for longitudinally moving said cable means and means for gathering said barrier means.

2. A removable seawall according to claim 1 wherein said flexible membrane forms a plurality of compartmented pools for trapping water currents.

3. A removable seawall according to claim 2 wherein said compartmented pools are formed by sections of said membrane which extend transversely to each other.

4. A removable seawall according to claim 3 wherein said compartmented pools are rectangular.

5. A removable seawall according to claim 4 wherein said compartmented pools are contiguous and are connected to respective corners of said compartmented pools.

6. A removable seawall according to claim 3 wherein said compartmented pools are formed partially by a shoreline.

7. A removable seawall according to claim 6 wherein said compartmented pools are pentagonal.

8. A removable seawall according to claim 1 wherein said means for gathering comprises means for rolling said flexible membrane thereabout.

9. A removable seawall according to claim 8 wherein said means for deploying and retracting comprises a said cable means having ends connected to said intersecting walls and means for reeling said cable means in to pull said flexible membrane into an operative position.

10. A removable seawall according to claim 9 wherein said dolphin means is pivotally mounted to said floor and comprises pulley means for receiving said cable means whereby tension on said cable means moves said dolphin means into an operative position.

11. A removable seawall according to claim 10 wherein said flexible membrane comprises a plurality of flexible membranes arranged to form X-shaped elements and said cable means is attached to respective ones of three ends of said X-shaped elements.

12. A removable seawall according to claim 10 wherein said flexible membrane comprises a plurality of flexible membranes arranged to form T-shaped elements and said cable means is attached to respective ones of two ends of said T-shaped elements.

13. A removable seawall according to claim 10 wherein said flexible membrane comprises a plurality of flexible membranes arranged to form Y-shaped elements and said cable means is attached to respective ones of two ends of said Y-shaped elements.

14. A method of preserving a beach comprising deploying a removable seawall prior to the onset of a storm and retracting said removable seawall after cessation of said storm, wherein said removable seawall comprises barrier means for extending into a body of water and engaging waves in said body of water, means for deploying said barrier to an operative position and for retracting said barrier to an inoperative position, and dolphin means for attachment to a floor in said body of water, said barrier means comprises a flexible membrane having at least two walls which intersect at a non-zero angle for forming an area for confining said water, said means for deploying and retracting said barrier means comprises cable means attached to each of said two walls for extending from a first location near the edge of said body of water to said dolphin means and to said first location, means for longitudinally moving said cable means and means for gathering said barrier means.

15. A method for deploying or retracting a seawall comprising providing a flexible membrane having at least two walls intersecting at a non-zero angle with a first cable attached to a first of said walls and a second cable attached to a second of said walls, providing the first and second dolphin means spaced from each other in a body of water and passing said first cable through pulley means on said first dolphin means and passing said second cable through pulley means on said second dolphin means, and pulling on said first and second cables to deploy said flexible membrane into said body of water to provide a pool for trapping water currents.

16. A method according to claim 15 further comprising the step of retracting said flexible membrane by reeling said flexible membrane around spindle means while releasing tension on said first and second cables.

* * * * *